(12) United States Patent
Kishida

(10) Patent No.: US 7,164,381 B2
(45) Date of Patent: Jan. 16, 2007

(54) TARGET IDENTIFYING APPARATUS, TARGET IDENTIFYING METHOD, AND TARGET IDENTIFYING PROGRAM

(75) Inventor: Masayuki Kishida, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 106 days.

(21) Appl. No.: 11/110,801

(22) Filed: Apr. 21, 2005

(65) Prior Publication Data

US 2005/0285775 A1 Dec. 29, 2005

(30) Foreign Application Priority Data

Apr. 21, 2004 (JP) ............................ P2004-125794

(51) Int. Cl.
  *G01S 13/93* (2006.01)
  *G01S 7/40* (2006.01)
(52) U.S. Cl. ........................... 342/70; 342/71; 342/72; 342/107; 342/108; 342/195; 342/174
(58) Field of Classification Search ............ 342/70–72, 342/195, 107, 108, 174
  See application file for complete search history.

(56) References Cited

U.S. PATENT DOCUMENTS

| 3,978,482 | A | * | 8/1976 | Williams et al. | ............. 342/142 |
| 4,148,026 | A | * | 4/1979 | Gendreu | ....................... 342/80 |
| 5,093,667 | A | * | 3/1992 | Andricos | ..................... 342/372 |
| 5,565,870 | A | * | 10/1996 | Fukuhara et al. | ............. 342/70 |
| 6,239,740 | B1 | * | 5/2001 | Collins et al. | .............. 342/109 |
| 6,670,911 | B1 | * | 12/2003 | Kishida et al. | ............... 342/70 |
| 6,690,319 | B1 | * | 2/2004 | Matsui et al. | ................. 342/70 |
| 6,778,129 | B1 | * | 8/2004 | Ishii et al. | ................... 342/109 |
| 6,798,373 | B1 | * | 9/2004 | Kishida | ....................... 342/70 |
| 6,861,973 | B1 | * | 3/2005 | Kishida | ...................... 342/109 |
| 2004/0130480 | A1 | * | 7/2004 | Hellsten | ....................... 342/59 |
| 2005/0285775 | A1 | * | 12/2005 | Kishida | ....................... 342/70 |

FOREIGN PATENT DOCUMENTS

JP        A 2002-14165        1/2002

* cited by examiner

*Primary Examiner*—John B. Sotomayor
(74) *Attorney, Agent, or Firm*—Oliff & Berridge, PLC

(57) ABSTRACT

A target identifying apparatus identifies a target from a first signal distribution and includes a calculation section, a target signal identifying section, a subtraction section, and a correction section. The calculation section calculates a quadratic approximate expression in the first signal distribution. The target signal, identifying section identifies a signal contained in the quadratic approximate expression as a single target signal. The subtraction section subtracts a value of the quadratic approximate expression from a value of the first signal distribution to generate a second signal distribution. When the one of the beam angle and the frequency corresponding to a maximum value of the second signal distribution is in a range where the value of the quadratic approximate expression is subtracted or is in a vicinity of the range, the correction section corrects the second signal distribution based on the quadratic approximate expression.

13 Claims, 22 Drawing Sheets

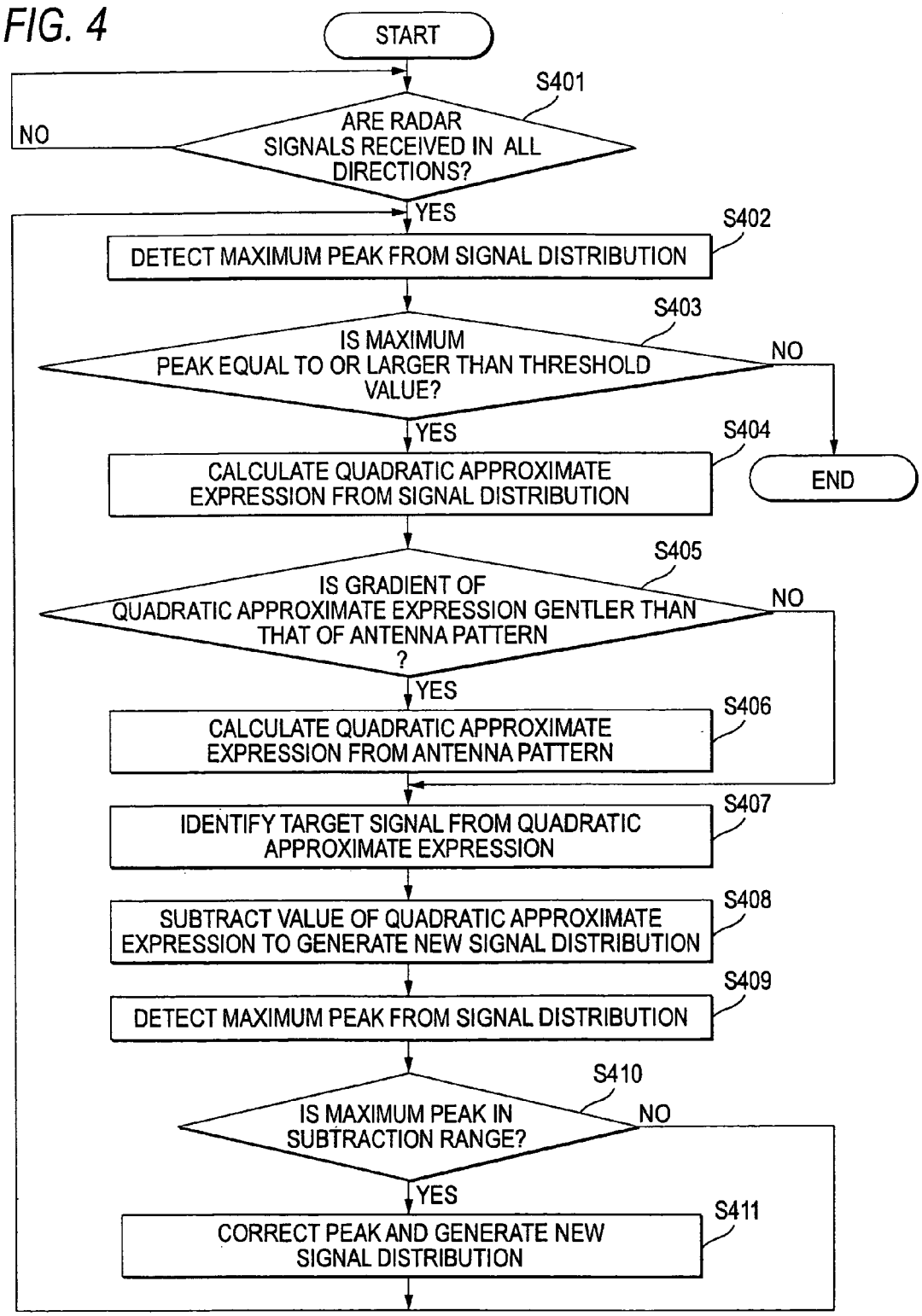

FIG. 14
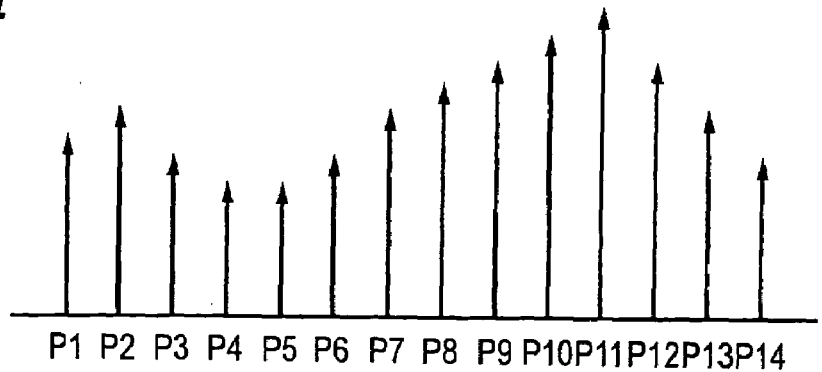
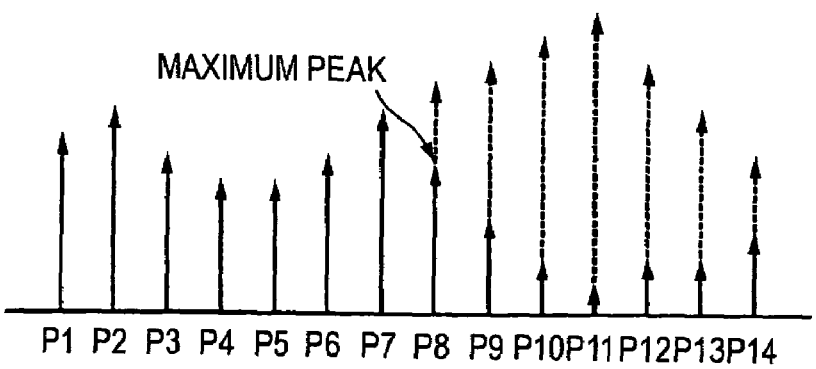
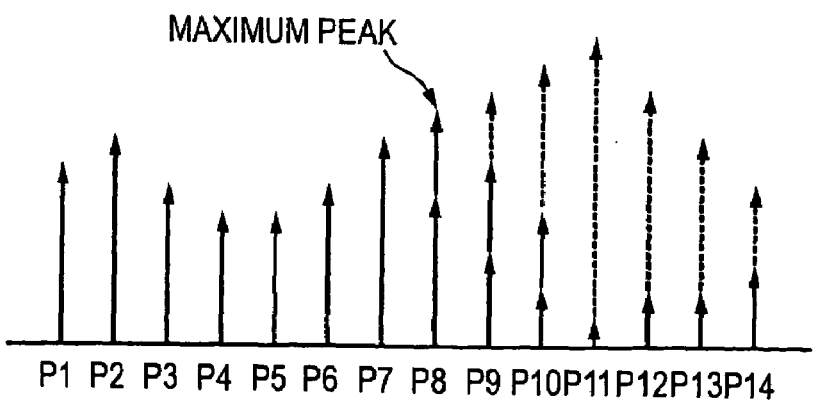

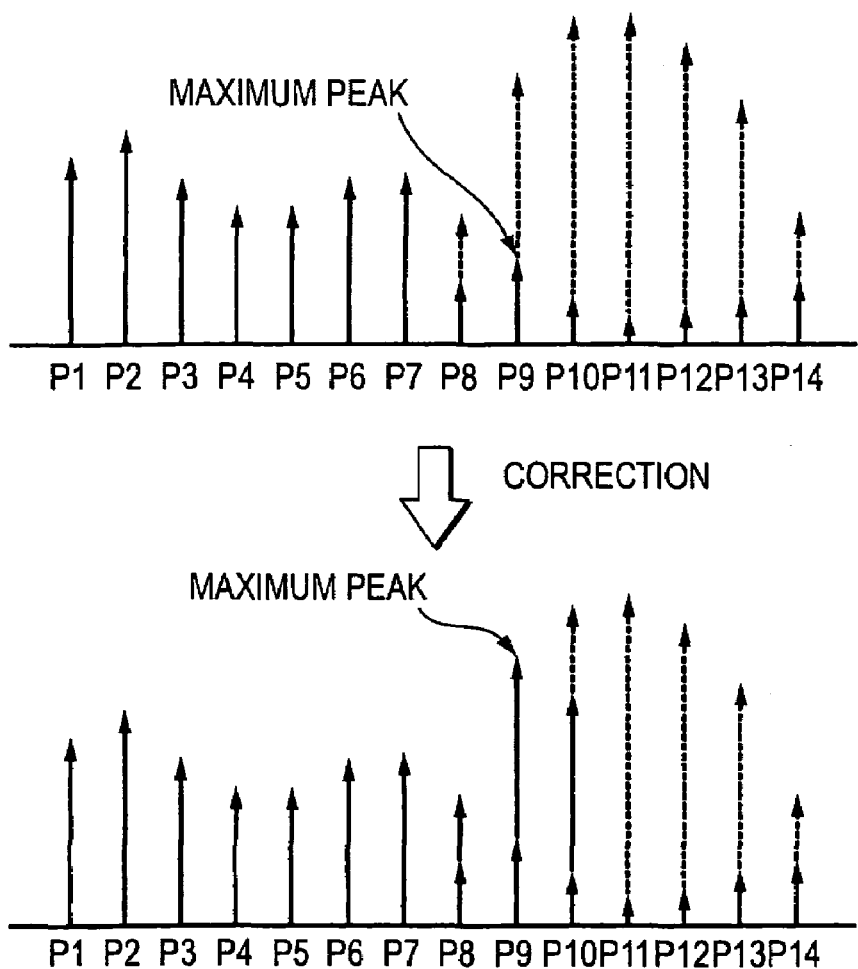

TARGET IDENTIFYING APPARATUS, TARGET IDENTIFYING METHOD, AND TARGET IDENTIFYING PROGRAM

BACKGROUND OF THE INVENTION

1. Field of the Invention

This invention relates to a target identifying apparatus, a target identifying method, and a target identifying program for identifying from a signal distribution with beam angle or frequency provided by a scan radar as a parameter, a target contained in the signal distribution.

2. Description of the Related Art

Hitherto, a on-vehicle radar sensor installed, which is a scan radar of FM-CW for emitting a continuous transmission signal frequency-modulated with a triangular wave and receiving a reflected wave from a target (another vehicle ahead of the vehicle) for each beam angle as a reception signal, thereby calculating a direction angle of the target, distance to the target, and relative speed between the radar sensor and the target has been available as shown in FIG. 2A.

The calculation method will be briefly discussed. In the scan radar, a signal distribution with beam angles used as a parameter in which power of a reception signal is distributed for each beam angle is generated as shown in FIG. 2B. The direction angle of the target is calculated from the signal distribution. The transmission signal is mixed with the reception signal to find a beat signal for each beam angle. Then, the beat signal is subjected to fast Fourier transform (FFT) for each beam angle. In a rising section and a falling section for each beam angle, a signal distribution with frequencies used as a parameter in which the power of the beat signal is distributed for each frequency is generated as shown in FIG. 10B. The distance to the target and the relative speed between the radar and the target are calculated from the signal distribution (peak frequency) in the rising section and the signal distribution (peak frequency) in the falling section.

Thus, in the scan radar, the direction angle of the target, the distance to the target, and the relative speed between the radar and the target are calculated from the signal distributions with beam angles and frequencies used as the parameter. For example, if a plurality of targets are close to each other in the left and right direction as shown in FIG. 2A, a peak (signal) for each target does not clearly appear in the signal distribution as shown in FIG. 2C. To solve this problem, measures for narrowing a beam width of an antenna for shortening sampling intervals (beam angle intervals), thereby clearly forming a plurality of peaks in the signal distribution has been conceived. However, if a beam width of an antenna is narrowed, new problems occur. That is, since an area of the antenna is enlarged, size of the radar becomes large. Also, since number of beams increases, processing load increases.

Thus, hitherto, it has been a general practice to use an art of applying an antenna pattern (antenna application pattern) to a signal distribution in which a peak for each target does not clearly appear as disclosed in JP-A-2002-14165. That is, as shown in FIG. 11A, the antenna pattern is matched with the signal distribution, thereby removing a side lobe component from the signal distribution to generate a new signal distribution as shown in FIG. 11B. The presence of a target is identified from the newly generated signal distribution and then, the direction angle of the identified target is calculated.

SUMMARY OF THE INVENTION

By the way, in JP-A-2002-14165, there is no problem in matching in the vicinity of the center. However, as being away from the center of the signal distribution, it is feared that apart of the signal distribution where a target actually exists may also be erased as the side lobe component of the signal distribution. That is, as a result of matching the antenna pattern with the signal distribution, a new signal distribution in which a signal of a target placed away from the center of the signal distribution and close to another target appears as a small peak is generated as shown in FIG. 11B. If the peak is equal to or less than a threshold value for noise removal or that for target identifying, this peak is not identified as one target signal. Therefore, the target cannot be detected (lost target); this is a problem. Also, an error of the direction angle of the target is large (variation in direction angle); this is a problem.

The problems are not necessarily limited to a case where a plurality of targets are close to each other in the left and right direction (see FIG. 2A) in calculating the direction angle of the target. If a plurality of targets are close to each other back and forth (see FIG. 10A) in calculating the direction angle of the target, a peak (signal) for each target does not clearly appear in the signal distribution as shown in FIG. 10C. Consequently, a similar problem occurs.

The invention provides a target identifying apparatus, a target identifying method, and a target identifying program capable of reliably identifying targets even from a signal distribution in which a peak (signal) for each target does not clearly appear due to that a plurality of targets are close to each other in the left and right direction or back and forth.

To the end, according to one embodiment of the invention, a target identifying apparatus identifies a target from a first signal distribution obtained by a scan radar. The target identifying apparatus includes a calculation section, a target signal identifying section, a subtraction section, and a correction section. The calculation section calculates a quadratic approximate expression in the first signal distribution. The first signal distribution includes one of beam angles and frequencies as a parameter. The quadratic approximate expression has the one of the beam angle and the frequency corresponding to a maximum value of the first signal distribution at a center thereof. The target signal identifying section identifies a signal contained in the quadratic approximate expression calculated by the calculation section as a single target signal. The target signal indicates the target. The subtraction section subtracts a value of the quadratic approximate expression calculated by the calculation section from a value of the first signal distribution to generate a second signal distribution. When the one of the beam angle and the frequency corresponding to a maximum value of the second signal distribution generated by the subtraction section is in a range in which the value of the quadratic approximate expression is subtracted from the value of the first signal distribution or is in a vicinity of the range, the correction section corrects the second signal distribution based on the quadratic approximate expression. When the correction section corrects the second signal distribution, the calculation section treats the corrected second signal distribution as a new first signal distribution. When the correction section does not correct the second signal distribution, the calculation section treats the second signal distribution as a new first signal distribution.

With this configuration, if identifying one target involves deleting a peak caused by another target, the correction section corrects the deleted peak to generate a new signal distribution (the corrected second signal distribution) in which signals of the other target is not erased but appears clearly. Therefore, the target identifying apparatus can identify a target reliably even from a signal distribution in which a peak (signal) for each target does not clearly appear because a plurality of targets are close to each other in the left and right direction or back and forth (see FIGS. 2C and 10C). Further, since the targets can be thus reliably identified, it is also made possible to prevent target from being lost and prevent variation in the direction angle of a target.

BRIEF DESCRIPTION OF THE DRAWINGS

In the accompanying drawings:

FIG. 4 is a flowchart showing a flow of target identifying process performed by the target identifying section;

FIG. 14 is a drawing to describe correction performed by the target identifying section;

FIG. 18 is a drawing to describe correction performed by the target identifying section.

DETAILED DESCRIPTION OF THE PREFERRED EMBODIMENTS

Figure 1:
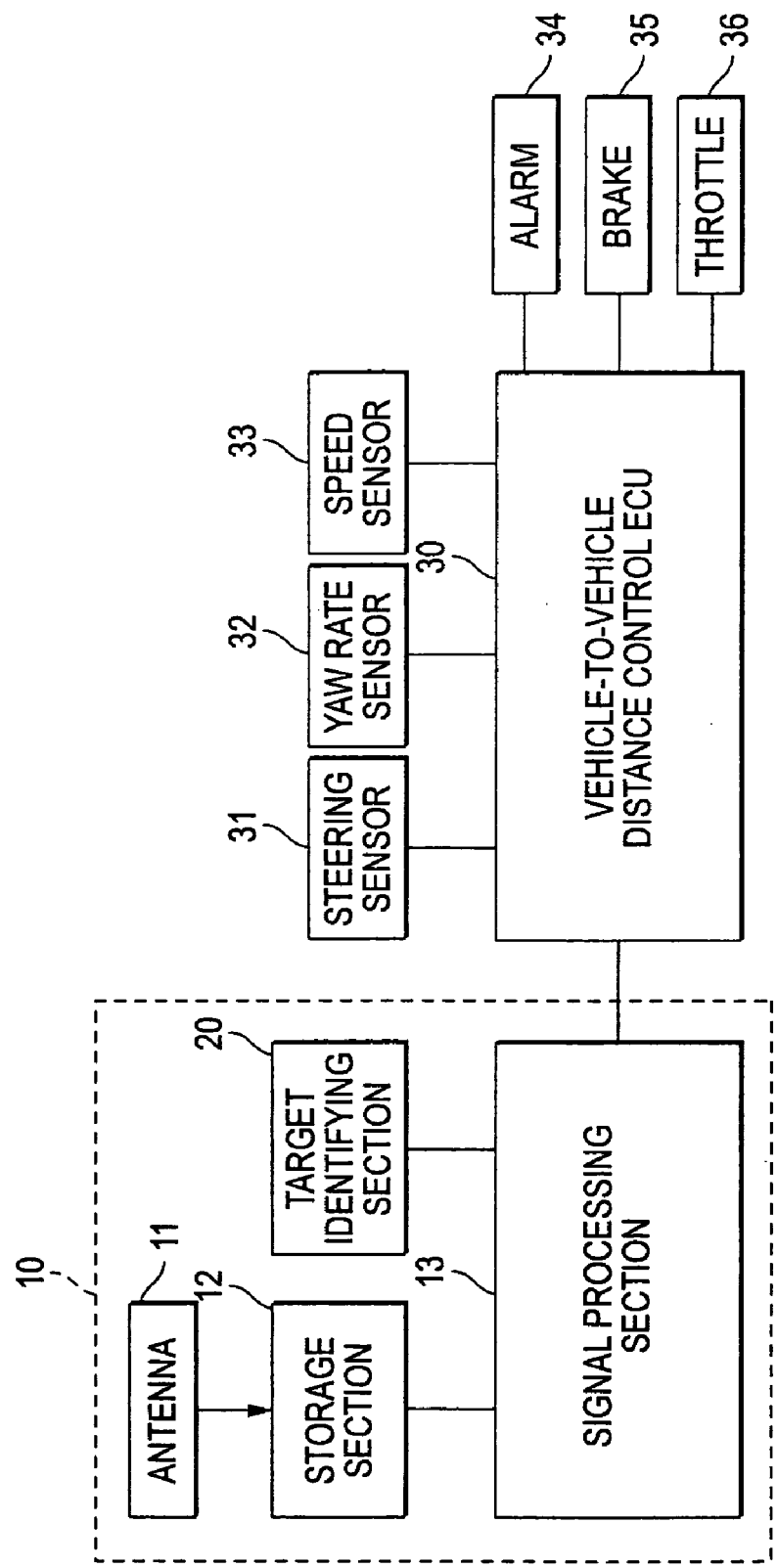
FIG. 1 is a block diagram showing the general configuration of a vehicle-to-vehicle distance control system including a radar sensor according to a first embodiment of the invention.

Referring now to the accompanying drawings, a target identifying apparatus, a target identifying method, and a target identifying program according to preferred embodiments of the invention will be described below. In first to third embodiments, the invention is applied to an on-vehicle radar sensor will be discussed in order.

First Embodiment

In the first embodiment, an outline of a radar sensor according to the first embodiment (1: outline of radar sensor), the configuration and processing flow involved in target identifying (2: Configuration of target identifying section and 3: Process performed by the target identifying section 20), the advantages of the first embodiment (4: Advantages of first embodiment), and modifications of the first embodiment (5: Modifications of first embodiment) will be discussed in order.

[1: Outline of Radar Sensor]

To begin with, an outline of a radar sensor according to the first embodiment will be discussed with reference to FIG. 1. FIG. 1 is a block diagram showing the general configuration of a vehicle-to-vehicle distance control system including a radar sensor 10 according to the first embodiment. As shown in the figure, the vehicle-to-vehicle distance control system includes a vehicle-to-vehicle distance control ECU 30 and the radar sensor 10, a steering sensor 31, a yaw rate sensor 32, a speed sensor 33, an alarm 34, a brake 35, and a throttle 36 connected to the vehicle-to-vehicle distance control ECU 30 so that they communicate with each other.

Roughly, the vehicle-to-vehicle distance control ECU 30 of the vehicle-to-vehicle distance control system determines the collision possibility with a target (target on the periphery of the home vehicle such as a vehicle ahead, a side vehicle, a following vehicle, a motorcycle, or a bicycle) based on home vehicle information and periphery information acquired from the sensors such as the radar sensor 10, the steering sensor 31, the yaw rate sensor 32, and the speed sensor 33, and performs vehicle control of sounding an alert from the alarm 34, applying the brake 35, easing up on the throttle 36, etc.

Figure 2A:
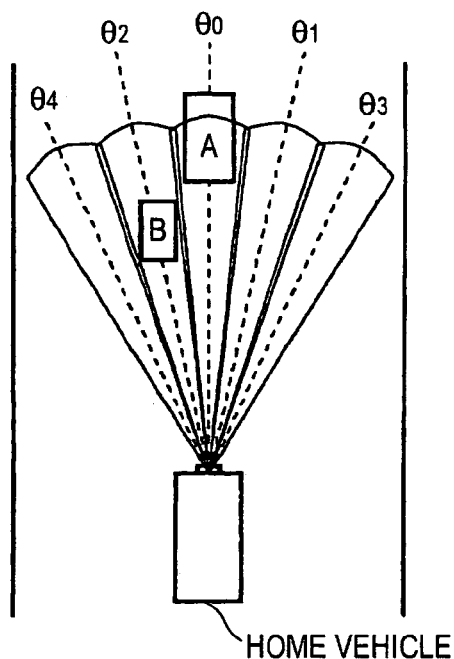
FIG. 2A is a drawing to describe that the radar sensor identifies targets arranged in the left and right direction.

Among the various sensors, the radar sensor 10 according to the first embodiment is an on-vehicle scan radar of FM-CW including an antenna 11, a storage section 12, a signal processing section 13, and a target identifying section 20, as shown in FIG. 1. Roughly, a continuous transmission signal frequency-modulated with a triangular wave is emitted from the antenna 11 and a reflected wave (radar signal) from a target (target such as a vehicle ahead of the home vehicle) is received at the antenna 11 for each beam angle as a reception signal, thereby calculating the direction angle of the target, the distance to the target, the relative speed between the radar sensor 10 and the target as shown in FIG. 2A. Schematic processing of the radar sensor 10 will be given below.

Figure 2B:
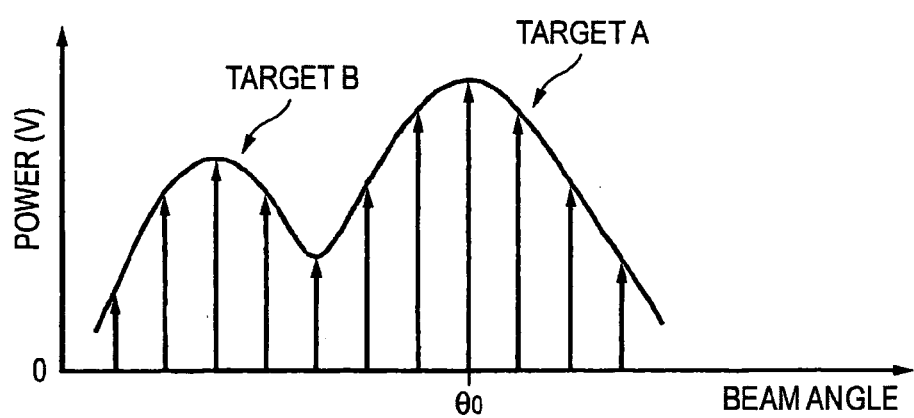
FIG. 2B is a drawing to describe that the radar sensor identifies targets arranged in the left and right direction.

In the radar sensor 10, upon reception of a reception signal for each beam angle at the antenna 11, a signal distribution in which the power of the reception signal is distributed for each beam angle with the beam angles used as a parameter is generated (the power of the reception signal is stored in the storage section 12 for each beam angle) as shown in FIG. 2B. The signal processing section 13 calculates the direction angle of the target from the signal distribution.

Figure 10A:
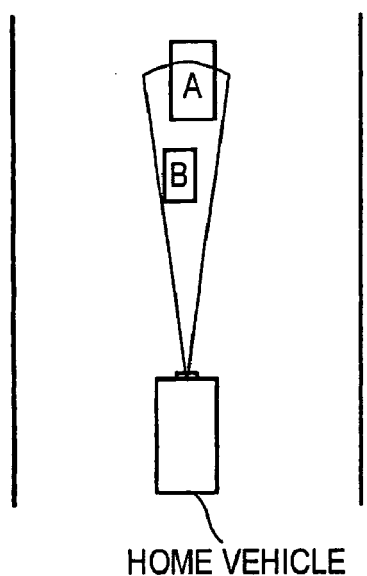
FIG. 10A is a drawing to describe that that the radar sensor identifies targets arranged in the back and forth direction.
Figure 10B:
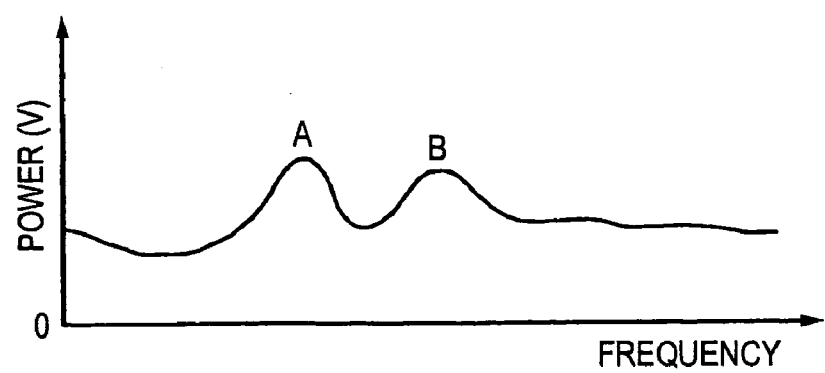
FIG. 10B is a drawing to describe that that the radar sensor identifies targets arranged in the back and forth direction.

The transmission signal is mixed with the reception signal to find a beat signal for each bean angle. Then, the beat signal is subjected to fast Fourier transform (FFT) for each beam angle. In the rising section of frequencies and the falling section of frequencies for each beam angle, a signal distribution in which the power of the beat signal is distributed for each frequency with the frequencies used as a parameter is generated (the power of the beat signal is stored in the storage section 12 for each frequency) as shown in FIG. 10B. The signal processing section 13 calculates the distance to the target and the relative speed between the radar sensor 10 and the target from the signal distribution (peak frequency) in the rising section and the signal distribution (peak frequency) in the falling section.

Thus, the signal processing section 13 of the radar sensor 10 calculates the direction angle of the target, the distance to the target, and the relative speed between the radar sensor 10 and the target and outputs the calculation result to the vehicle-to-vehicle distance control ECU 30. Before the calculation, the target identifying section 20 identifies the target contained in the signal distribution from the signal distribution. That is, a target exists for each peak appearing in the signal distribution as shown in FIGS. 2B and 10B. Therefore, the target identifying section 20 identifies a signal contained in each peak (a signal forming a peak) as a single target signal, and outputs the identifying result to the signal processing section 13.

Consequently, if the target identifying section 20 identifies a plurality of targets in the left and right direction, the signal processing section 13 calculates the direction angle of the target for each identified target. If the target identifying section 20 identifies a plurality of targets back and forth, the signal processing section 13 finds a peak frequency for each identified target (finds a peak frequency for each target in the rising section of frequencies and the falling section of frequencies) and pairs the peak frequencies of the same target in the rising section of frequencies and the falling section of frequencies and then calculates the distance to each target and the relative speed between the radar sensor 10 and each target.

As described above, the radar sensor 10 according to the first embodiment identifies a target in the left and right direction from the signal distribution in which the power of the reception signal is distributed for each beam angle (see FIG. 2B) and then, calculates the direction angle of each target. The radar sensor 10 identifies a target back and forth from the signal distribution in which the power of the beat signal is distributed for each frequency (see FIG. 10B) and then, calculates the distance to each target and the relative speed between the radar sensor 10 and each target. The radar sensor 10 according to the first embodiment can identify each target reliably even from a signal distribution in which a peak (signal) for each target does not clearly appear because a plurality of targets are close to each other in the left and right direction or back and forth.

The target identifying section 20 according to the first embodiment repeats a process of calculating a quadratic approximate expression having a beam angle (or frequency) corresponding to a maximum value of the signal distribution (first signal distribution) at a center thereof and identifying signals contained in the quadratic approximate expression as a single target signal (see FIGS. 5A and 5B): and a process of subtracting the calculated values of the quadratic approximate expression from the values of the signal distribution to generate a new signal distribution (second signal distribution) (see FIGS. 7A and 7B) until identifying all targets contained in the signal distribution. That is, the quadratic approximate expression is calculated so as to take the maximum peak of the signal distribution at the center thereof in order not only for the initial signal distribution, but also for new signal distributions generated in sequence. The signals contained in the quadratic approximate expression are identified as a single target signal in sequence. The values of the quadratic approximate expression are subtracted from the values of the signal distribution to generate a new signal distribution in sequence. Accordingly, all targets contained in the signal distribution are identified (see FIG. 8B).

In repeating the processes set forth above, if a maximum value in the newly generated signal distribution (second signal distribution) is in a range in which the values of the quadratic approximate expression is subtracted from the values of the signal distribution (first signal distribution) (see FIG. 9A), the target identifying section 20 according to the first embodiment corrects the newly generated signal distribution based on the calculated quadratic approximate expression. It is noted that dotted lines (without arrow) indicate an envelope of the signal distribution before corrected (first signal distribution). Specifically, the target identifying section 20 according to the first embodiment adds to values of the newly generated signal distribution (second signal distribution) in the predetermined range including the maximum value thereof, a value of the quadratic approximate expression at a beam angle (or frequency) corresponding to the maximum value of the newly generated signal distribution (second signal distribution), to generate a new signal distribution (a corrected second signal distribution) (see FIG. 9B). That is, if identifying one target involves deleting a peak caused by another target, the target identifying section 20 corrects the deleted peak to generate a new signal distribution (the corrected second signal distribution) in which signals of the other target is not erased but appears clearly.

Figure 2C:
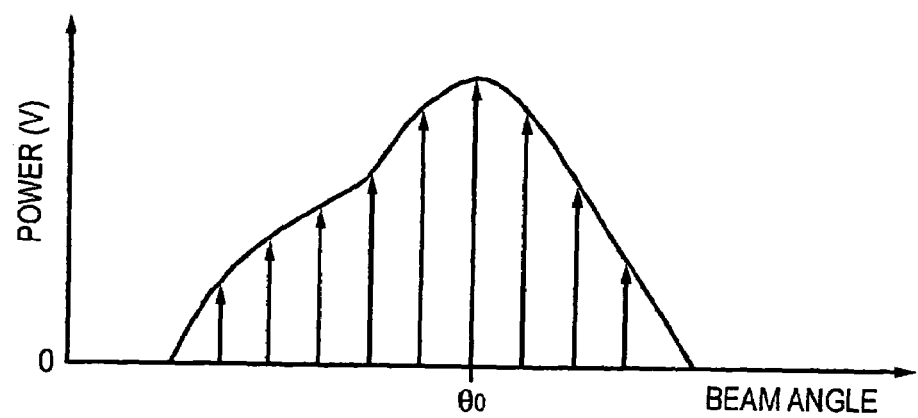
FIG. 2C is a drawing to describe that the radar sensor identifies targets arranged in the left and right direction.
Figure 9C:
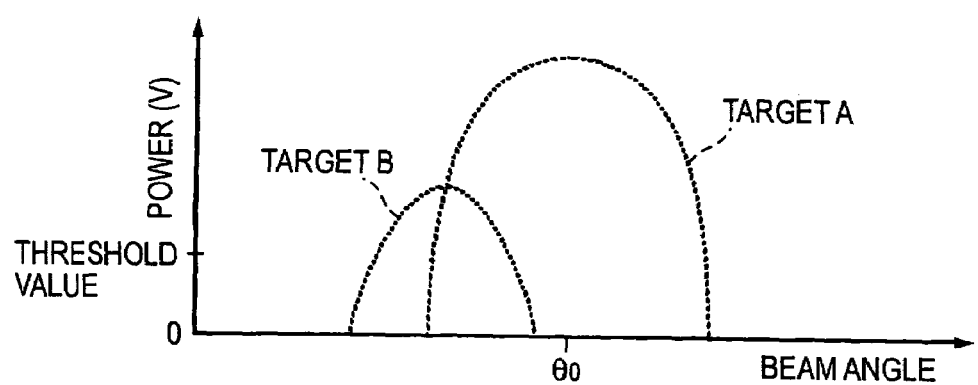
FIG. 9C is a drawing to show a specific example of the target identifying process.
Figure 10C:
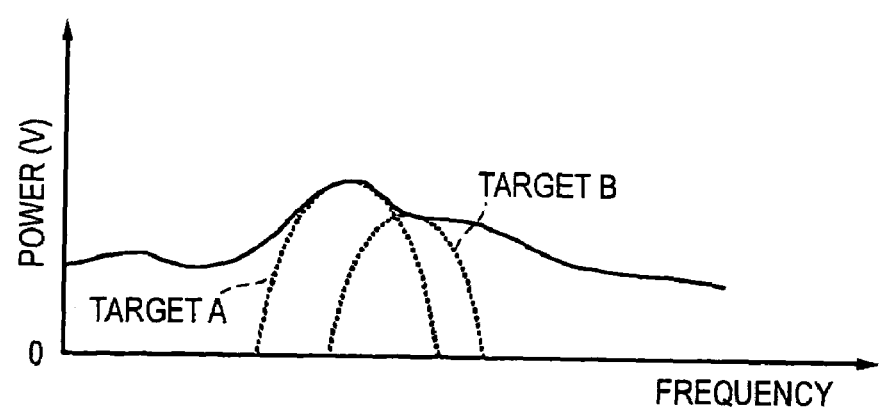
FIG. 10C is a drawing to describe that that the radar sensor identifies targets arranged in the back and forth direction.
Figure 11A:
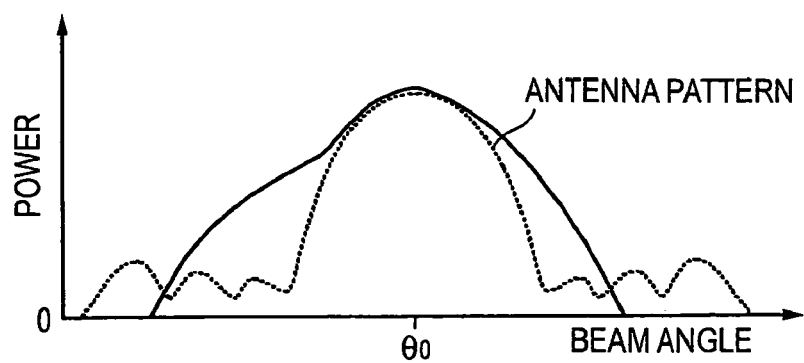
FIG. 11A is a drawing to describe matching with using an antenna pattern.
Figure 11B:
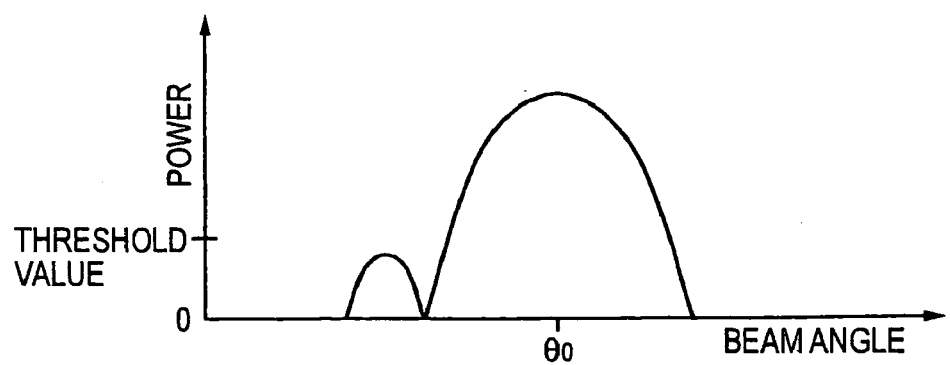
FIG. 11B is a drawing to describe watching with using the antenna pattern.

Therefore, the target identifying section 20 according to the first embodiment generates a new signal distribution in which signals of a nearby target are not erased but appear clearly (see FIGS. 9C and 10C) even from a signal distribution in which a peak (signal) for each target does not clearly appear because a plurality of targets are close to each other in the left and right direction or back and forth (see FIGS. 2C and 10C). Accordingly, it is made possible to reliably identify targets. Further, since the targets can be thus reliably identified, it is also made possible to prevent target from being lost and prevent variation in the direction angle of a target.

The configuration and process flow of the target identifying section 20 will be discussed in detail below. The target identifying section 20 according to the first embodiment executes the processes described above in the case of identifying targets arranged side by side from a signal distribution in which the power of the reception signal is distributed for each beam angle (see FIGS. 2B and 2C) and a case of identifying targets arranged back and forth from a signal distribution in which the power of the beat signal is distributed for each frequency (see FIGS. 10B and 10C). Since similar process is performed in the both cases, the former process will be discussed in detail.

[2; Configuration of Target Identifying Section]

Figure 3:
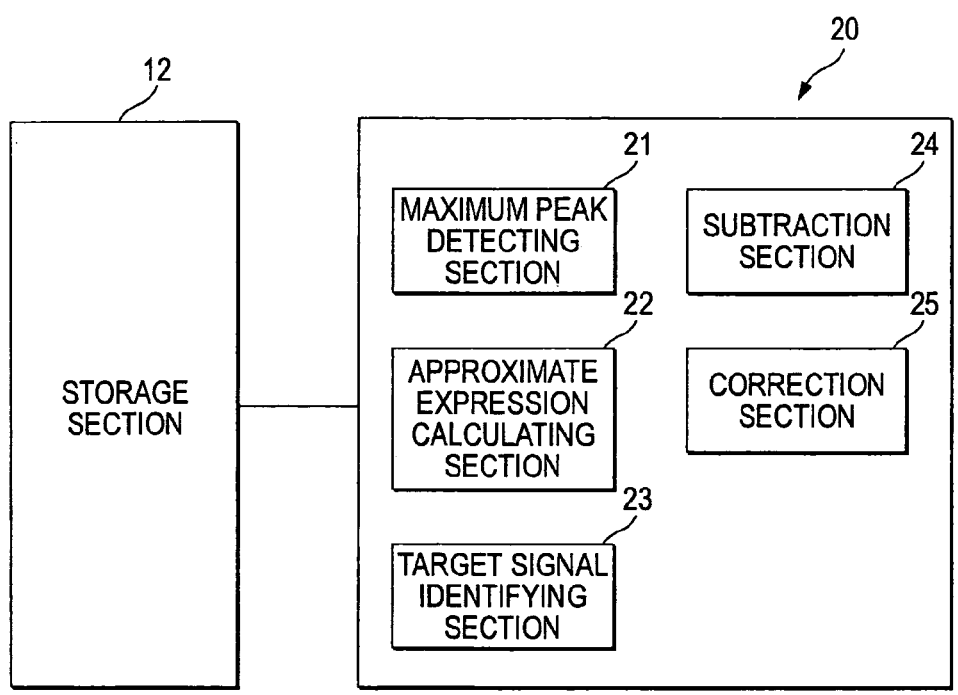
FIG. 3 is a block diagram showing the configuration of a target identifying section.

Next, the configuration of the target identifying section 20 in the radar sensor 10 shown in FIG. 1 will be discussed with reference to FIG. 3. FIG. 3 is a block diagram showing the configuration of the target identifying section 20. As shown in the figure, the target identifying section 20 is connected to the storage section 12 for storing data and programs, which are required for various processes performed by the radar sensor 10.

Specifically, the storage section 12 stores a signal distribution in which power of a reception signal is distributed for each beam angle with beam angles used as a parameter (the power of the reception signal for each beam angle) as shown in FIG. 2B, a signal distribution in which power of a beat signal is distributed for each frequency with frequencies used as a parameter (the power of the beat signal for each frequency) as shown in FIG. 10B, and data being processed by the target identifying section 20 (newly generated signal distribution (second signal distribution and corrected second signal distribution)).

The power of the signal distribution mentioned here is a voltage value of a signal rather than a decibel value. That is, a signal distribution made up of voltage values of signals rather than decibel values of the signals (signal distribution made up of reflection electric power sums) is stored in the storage section 12. The target identifying section 20 uses the stored voltage values to execute target identifying operation process.

The target identifying section 20 is a control section, which has internal memory for storing control programs such as an OS (operating system), programs defining procedures of the various processes, and required data and executes target identifying process according to the programs and the data. The target identifying section 20 includes a maximum peak detecting section 21, an approximate expression calculating section 22, a target signal identifying section 23, a subtraction section 24, and a correction section 25 as shown in FIG. 3.

Figure 5A:
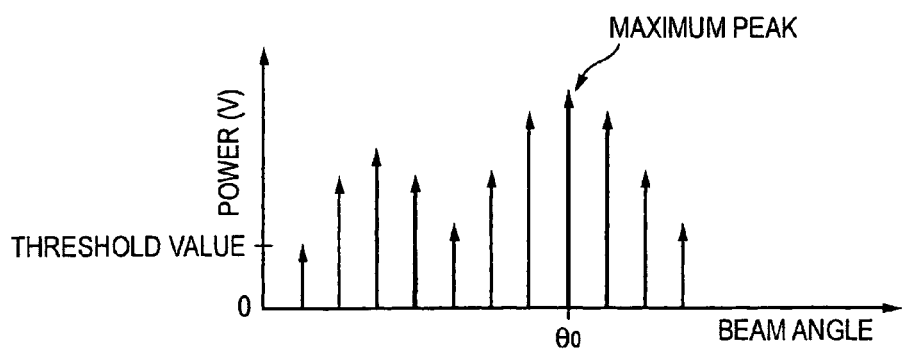
FIG. 5A is a drawing to show a specific example of the target identifying process.
Figure 8A:
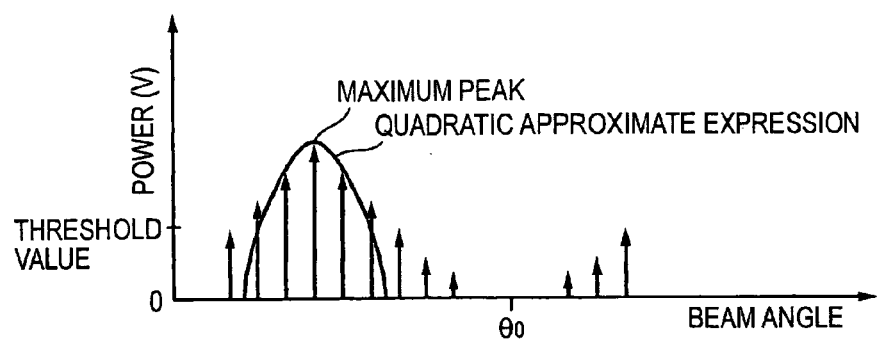
FIG. 8A is a drawing to show a specific example of the target identifying process.

The maximum peak detecting section 21 is a process section for detecting a maximum value (maximum peak) from a signal distribution. Specifically, when radar signals are received from all directions and a signal distribution (first signal distribution) in which power of the reception signal is distributed for each beam angle is stored in the storage section 12, the maximum peak detecting section 21 detects a maximum peak as shown in FIG. 5A. If a new signal distribution (second signal distribution or corrected second signal distribution) is generated by the subtraction section 24 and the correction section 25 described later and is stored in the storage section 12, the maximum peak detecting section 21 also detects a maximum peak as shown in FIGS. 8A and 9B. Further, after detecting the maximum peak, the maximum peak detecting section 21 also determines whether or not the maximum peak value is equal to or greater than a threshold value (threshold value for noise removal or threshold value for target identifying).

Figure 5B:
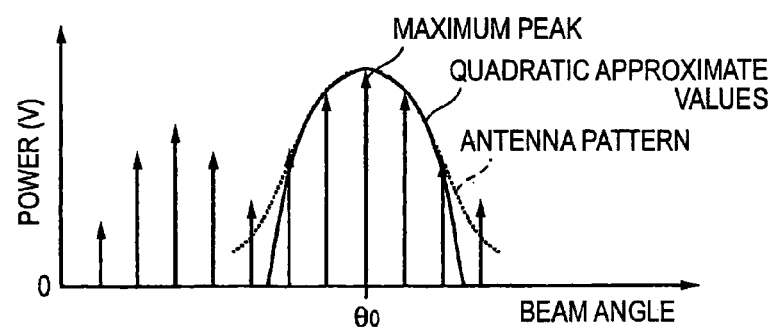
FIG. 5B is a drawing to show a specific example of the target identifying process.
Figure 6A:
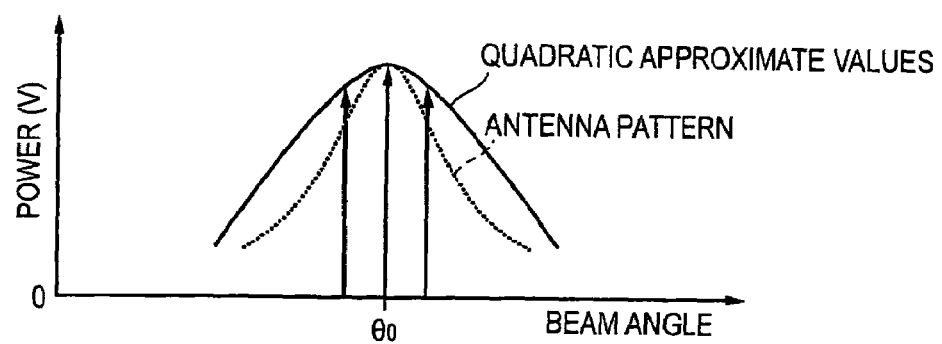
FIG. 6A is a drawing to show a specific example of the target identifying process.
Figure 6B:
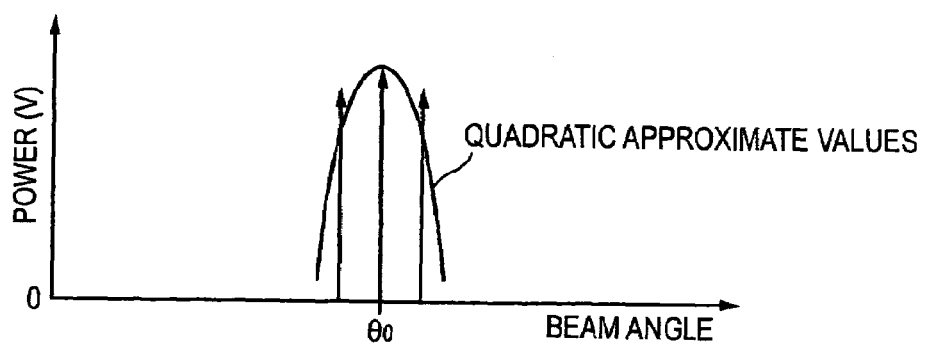
FIG. 6B is a drawing to show a specific example of the target identifying process.

The approximate expression calculating section 22 is a process section for calculating a quadratic approximate expression having a beam angle (or frequency) corresponding to a maximum peak in the signal distribution at a center thereof. Specifically, when the maximum peak detecting section 21 detects the maximum peak from the signal distribution, the approximate expression calculating section 22 uses a value of the maximum peak and its peripheral values (for example, values adjacent to both sides of the maximum peak) to calculate the quadratic approximate expression having the beam angle (or frequency) corresponding to the maximum peak at the center thereof as shown in FIG. 5B. Also, the approximate expression calculating section 22 determines whether or not a gradient of the quadratic approximate expression thus calculated is gentler than that of an antenna pattern previously stored in the storage section 12. If the gradient of the quadratic approximate expression is gentler than that of the antenna pattern, the approximate expression calculating section 22 newly calculates a quadratic approximate expression along the antenna pattern, as shown in FIGS. 6A and 6B.

Figure 7A:
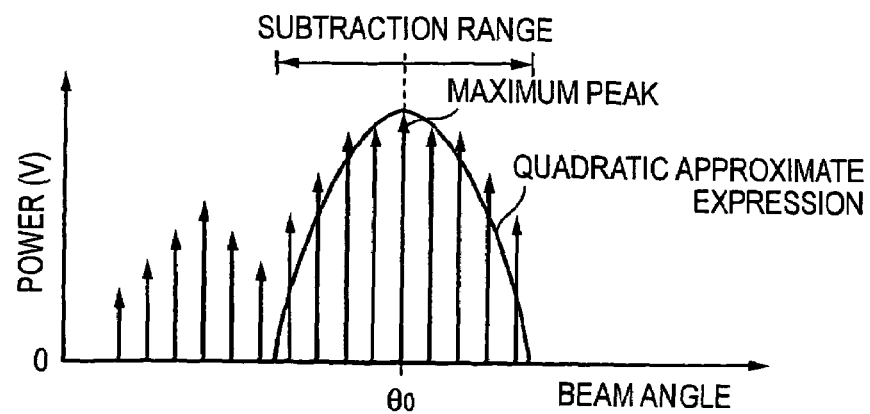
FIG. 7A is a drawing to show a specific example of the target identifying process.

The target signal identifying section 23 is a process section for identifying a target signal from the quadratic approximate expression. Specifically, when the approximate expression calculating section 22 calculates the quadratic approximate expression, the target signal identifying section 23 identifies signals contained in the calculated quadratic approximate expression (signals in a range sandwiched between two intersection points between curve of the quadratic approximate expression and the horizontal line) as a single target signal, as shown in FIG. 7A. The identifying result of the target signal identifying section 23 is stored in the storage section 12. The signal processing section 13 refers to the determination result stored in the storage section 12 and calculates a direction angle of each identified target.

Figure 7B:
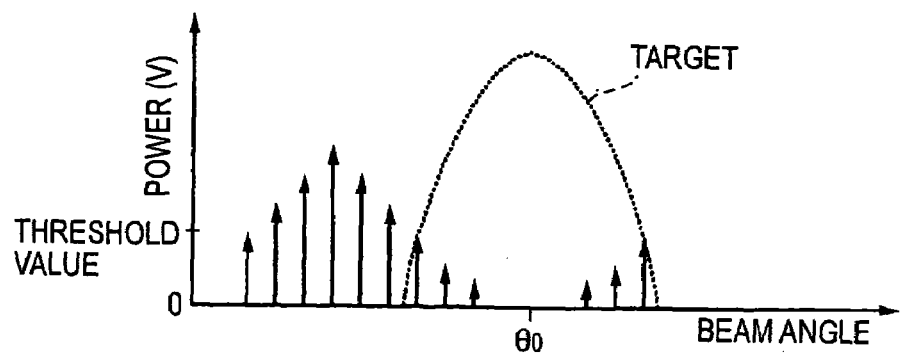
FIG. 7B is a drawing to show a specific example of the target identifying process.

The subtraction section 24 is a process section for subtracting values of the quadratic approximate expression from values of the signal distribution (first signal distribution) to generate a new signal distribution (second signal distribution). Specifically, when the target signal identifying section 23 identifies one target, the subtraction section 24 subtracts the values of the quadratic approximate expression used for the identifying from the values of the signal distribution to generate a new signal distribution, as shown in FIGS. 7A and 7B. In the subtraction processing, the subtraction section 24 performs subtraction only in a predetermined range including the maximum peak of the signal distribution as the center thereof (for example, nine signals containing the maximum peak) as shown in FIG. 7A rather than performs subtraction in the entire range of the signal distribution.

The correction section 25 is a process section for correcting the signal distribution newly generated by the subtraction section 24 (second signal distribution). Specifically, when the subtraction section 24 generates a new signal distribution (second signal distribution), the correction section 25 determines whether or not a maximum peak in the newly generated signal distribution (second signal distribution) is in a range in which the values of the quadratic approximate expression is subtracted from the values of the signal distribution (first signal distribution). If the maximum peak of the newly generated signal distribution (second signal distribution) is not in the subtraction range (see FIG. 8A), the correction section 25 does not make a correction. If the maximum peak of the newly generated signal distribution (second signal distribution) is in the subtraction range (see FIG. 9A), the correction section 25 adds to values of the newly generated signal distribution (second signal distribution) in the range including the maximum peak of the newly generated signal distribution (second signal distribution), a value of the quadratic approximate expression at a beam angle (or a frequency) corresponding to the maximum value of the newly generated signal distribution (second signal distribution). As a result, the correction section 25 generates a new signal distribution (corrected second signal distribution) as shown in the figure.

[3: Process Performed by the Target Identifying Section 20]

Subsequently, target identifying process performed by the target identifying section 20 will be discussed with reference to FIG. 4. FIG. 4 is a flowchart showing a flow of the target identifying process performed by the target identifying section 20. As shown in the figure, when radar signals are received from all directions and a signal distribution (first signal distribution) in which power of a reception signal is distributed for each beam angle is stored in the storage section 12 (step S401), the target identifying section 20 detects the maximum value (maximum peak) from the signal distribution (first signal distribution) as shown in FIG. 5A (step S402).

Further, the target identifying section 20 determines whether or not the value of the detected maximum peak of the signal distribution (first signal distribution) is equal to or larger than a threshold value (threshold value for noise removal or threshold value for target identifying) (step S403). If the value of the maximum peak is less than the threshold value (NO at step S403), the target identifying section 20 assumes that all targets contained in the signal distribution have been identified, and terminates the target identifying process.

In contrast, if the value of the maximum peak is equal to or larger than the threshold value of the signal distribution (first signal distribution) (YES at step S403), the target identifying section 20 uses the value of the maximum peak detected at step S402 and its peripheral values (for example, values adjacent to both sides of the maximum peak) to calculate the quadratic approximate expression having a beam angle (or frequency) corresponding to the maximum peak of the signal distribution (first signal distribution) at the center thereof as shown in FIG. 5B (step S404).

Further, the target identifying section 20 determines whether or not a gradient of the calculated quadratic approximate expression is gentler than that of the antenna pattern previously stored in the storage section 12 (step S405). If the gradient of the quadratic approximate expression is not gentler that of the antenna pattern as shown in FIG. 5B (No at step S405), the quadratic approximate expression calculated at step S404 is used as it is in the subsequent process described later.

In contrast, if the gradient of the quadratic approximate expression is gentler than that of the antenna pattern (YES at step S405), the target identifying section 20 newly calculates a quadratic approximate expression along the antenna pattern as shown in FIG. 6B (step S406).

The target identifying section 20 identifies a single target signal from the quadratic approximate expression calculated at step S404 or S406 (step S407). Specifically, the target identifying section 20 identifies signals contained in the quadratic approximate expression (signals in a range sandwiched between two intersection points between a curve of the quadratic approximate expression and the horizontal line) as a single target signal, as shown in FIG. 7A. The identifying result is stored in the storage section 12.

Subsequently, the target identifying section 20 subtracts the values of the quadratic approximate expression from the values of the signal distribution (first signal distribution) to generate a new signal distribution (second signal distribution) (step S408). Specifically, the values of the quadratic approximate expression used in the identifying at step S407 is subtracted from the values of the signal distribution (first signal distribution) only in the predetermined range including the maximum peak of the signal distribution (first signal distribution) at the center thereof to generate a new signal distribution (second signal distribution), as shown in FIGS. 7A and 7B.

Figure 8B:
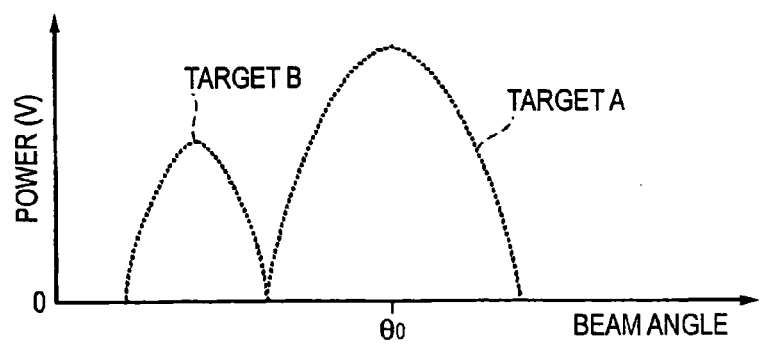
FIG. 8B is a drawing to show a specific example of the target identifying process.

Further, the target identifying section 20 detects a maximum peak in the signal distribution newly generated (second signal distribution) at step S408 and determines whether or not the detected maximum peak is in the range in which the values of the quadratic approximate expression are subtracted from the values of the signal distribution (first signal distribution) (steps S409 and S410). As a result of the determination, if the maximum peak of the newly generated signal distribution (second signal distribution) is not in the subtraction range as shown in FIG. 8A (NO at step S410), the signal distribution (second signal distribution) generated at step S408 is used as it is in the subsequent process described later. That is, the process starting at step S402 described above is also repeated for the newly generated signal distribution (second signal distribution) as shown in FIG. 8A. When all targets contained in the signal distribution (first signal distribution) are identified as shown in FIG. 8B, the target identifying process is terminated.

Figure 9A:
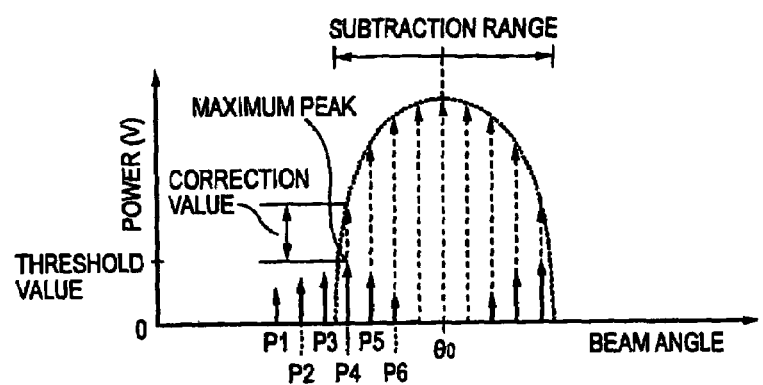
FIG. 9A is a drawing to show a specific example of the target identifying process.
Figure 9B:
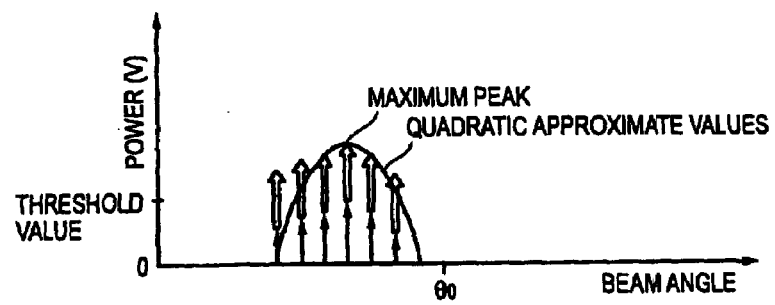
FIG. 9B is a drawing to show a specific example of the target identifying process.

In contrast, if the maximum peak of the newly generated signal distribution (second signal distribution) is in the subtraction range as shown in FIG. 9A (YES at step S410), the target identifying section 20 corrects the signal distribution (second signal distribution) newly generated at step S408 (step S411). Specifically, the target identifying section 20 adds to values of the newly generated signal distribution (second signal distribution) in the range including the maximum peak of the newly generated signal distribution (second signal distribution), a value of the quadratic approximate expression at a beam angle (or frequency) corresponding to the maximum value of the newly generated signal distribution (second signal distribution), as shown in FIGS. 9A and 9B, to generate a new signal distribution (corrected second signal distribution). The target identifying section 20 also repeats the process starting at step S402 described above for the signal distribution (second signal distribution or corrected second signal distribution) newly generated at step S411 (see FIG. 9B). When the target identifying section 20 identifies all targets contained in the signal distribution as shown in FIG. 9C, the target identifying section 20 terminates the target identifying process.

The target identifying process has been described by taking the case of identifying targets arranged in the left and right direction (side by side) from the signal distribution in which the power of the reception signal is distributed for each beam angle (see FIGS. 2B and 2C) as an example. However, similar process is also performed for each beam angle and section (rising section of frequencies and falling section of frequencies) in the case of identifying targets arranged back and forth from the signal distribution in which the power of the beat signal is distributed for each frequency (see FIGS. 10B and 10C). In this case, however, the target identifying process is started only if the beat signal is subjected to fast Fourier transform (FFT) in the rising section of frequencies or the falling section of frequencies at one beam angle to obtain the power for each frequency.

[4: Advantages of First Embodiment]

As described above, according to the first embodiment, if identifying one target involves deleting a peak caused by another target, the target identifying section 20 corrects the deleted peak to generate a new signal distribution (corrected second signal distribution) in which signals of the other target is not erased but appears clearly (see FIG. 9B). Therefore, it is made possible to reliably identify targets even from a signal distribution in which peak (signal) for each target does not clearly appear because a plurality of targets are close to each other in the left and right direction or back and forth (see FIGS. 2C and 10C). Further, since the targets can be thus reliably identified, it is also made possible to prevent a target from being lost and prevent variation in a direction angle of the target.

According to the first embodiment, the target identifying section 20 makes a correction made so as to restore to the original value a signal of an unidentified target whose the maximum peak has been deleted due to deletion of one target (see FIG. 9B). Therefore, it is made possible to identify each target with good accuracy for improving the calculation accuracy of the direction angle of the target, the distance to the target, and the relative speed between the radar sensor and the target.

According to the first embodiment, the target is identified with using the quadratic approximate expression prepared from the signal values in the vicinity of the maximum peak (see FIG. 5B, etc.,) rather than antenna patterns varying from one product to another. Therefore, it is made possible to identify each target with good accuracy for improving the calculation accuracy of the direction angle of the target, the distance to the target, and the relative speed between the radar sensor and the target.

According to the first embodiment, if the quadratic approximate expression prepared from the signals in the vicinity of the maximum peak deviates from the antenna pattern (see FIG. 6A), the quadratic approximate expression prepared from the antenna pattern (see FIG. 6B) is used in identifying the target. Therefore, it is made possible to prevent an accident of erroneously identifying a target with using the quadratic approximate expression deviating from the antenna pattern and also prevent an accident of erroneously deleting a signal caused by another target in the range located away from the maximum peak.

According to the first embodiment, signal subtraction is not performed in the range located away from the maximum peak (see FIG. 7A). Therefore, it is made possible to prevent inversion of signals in the range and identify also another target located away from the maximum peak with no error.

According to the first embodiment, operation process is performed with using the signal distribution made up of the voltage values of signals rather than the decibel values (signal distribution made up of reflection electric power sums). Therefore, the necessity for correction as shown in FIG. 9B (occasions where actual correction is made) is also lessened. As a result, it is made possible to identify a target with still better accuracy.

[5: Modifications of First Embodiment]

By the way, in the first embodiment, the case where a correction is executed if the maximum value in the signal distribution newly generated by the subtraction section 22 is in the range in which the values of the quadratic approximate expression are subtracted has been described. However, the invention is not limited thereto. A correction maybe executed if the maximum value is in the vicinity of the range.

That is, by way of example, a comparison is made between peaks (P3 and P5) adjacent to both sides of peak (P4) at an end of the subtraction range in the waveform shown in FIG. 9A. Xf the value of P3 is greater than the value of P5 (P3>P5), no correction may be made; if the value of P3 is smaller than the value of P5 (P3<P5), a correction may be made.

As another example, a comparison is made between peaks (P2 and P4) adjacent to both sides of peak (P3) adjacent to the subtraction range in the waveform shown in FIG. 9A. If the value of P2 is larger than the value of P4 (P2>P4), no correction may be made; if the value of P2 is smaller than the value of P4 (P2<P4), a correction may be made.

Second Embodiment

Figure 12:
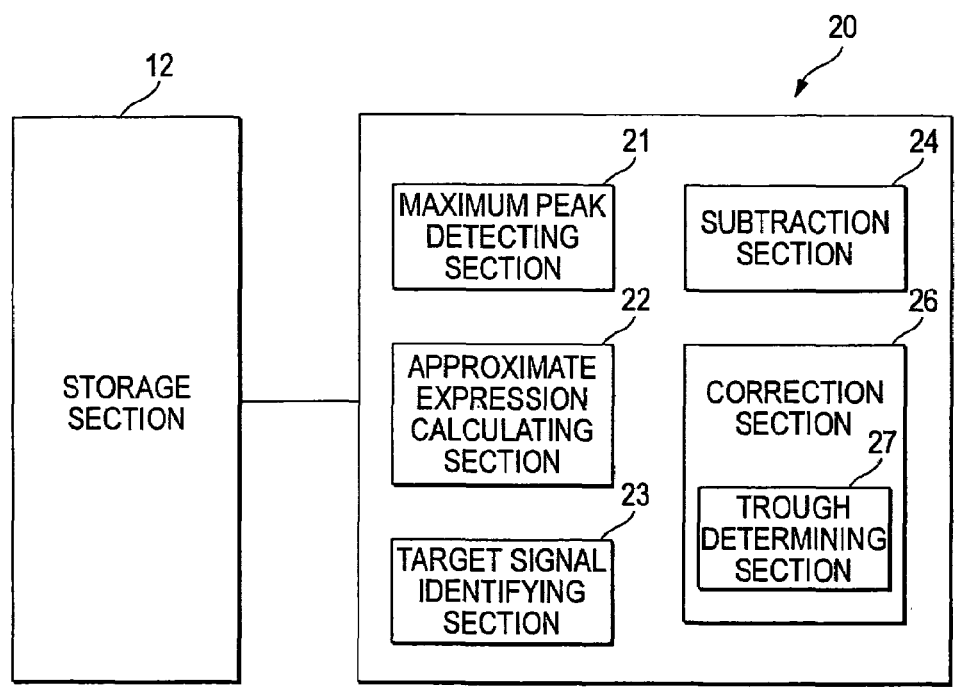
FIG. 12 is a block diagram showing the configuration of a target identifying section according to a second embodiment of the invention.
Figure 13A:
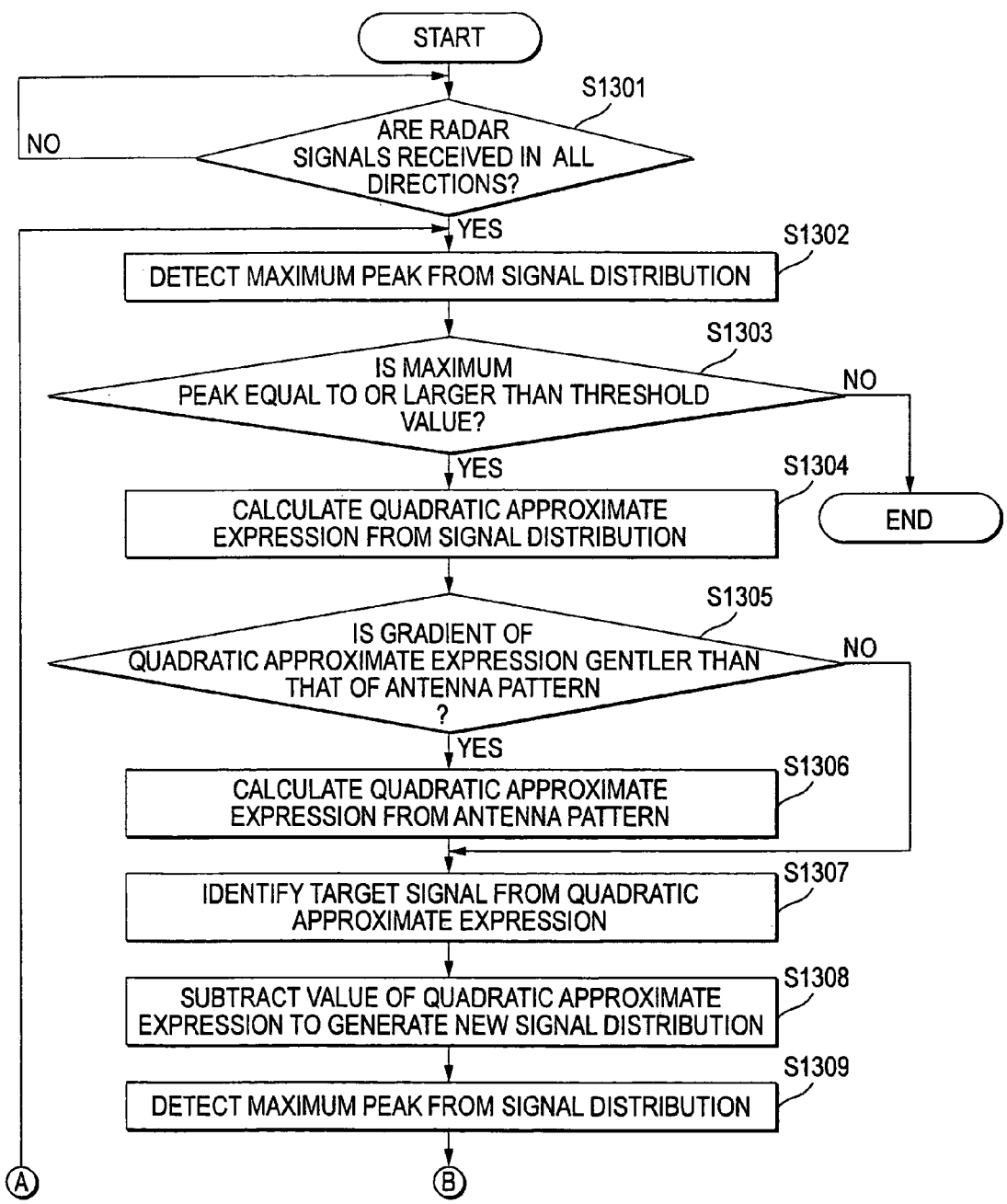
FIG. 13 is a flowchart showing a flow of target identifying process performed by the target identifying section.
Figure 13B:
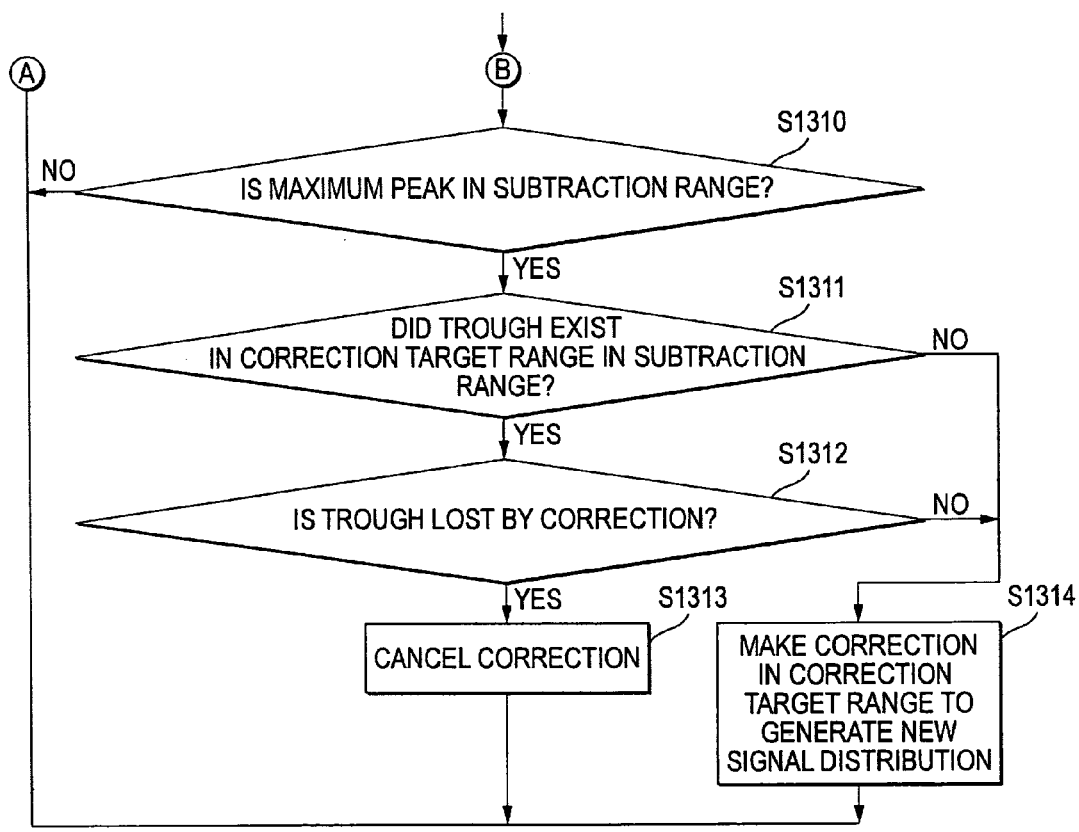

FIG. 12 is a block diagram showing the configuration of a target identifying section 20 according to a second embodiment of the invention. FIG. 13 is a flowchart showing a flow of target identifying process performed by the target identifying section 20. The target identifying section 20 according to the second embodiment includes a maximum peak detecting section 21, an approximate expression calculating section 22, a target signal identifying section 23, a subtraction section 24, and a correction section 26 as shown in FIG. 12.

The maximum peak detecting section 21, the approximate expression calculating section 22, the target signal identifying section 23, and the subtraction section 24 perform process similar to those with the same reference numerals previously described with reference to FIG. 3 in the first embodiment. On the other hand, correction process performed by the correction section 26 having a trough determining section 27 differs from that performed by the correction section 25 previously described in the first embodiment.

That is, as shown in FIG. 13, steps S1301 to S1310 in the flow of the target identifying process performed by the target identifying section 20 according to the second embodiment are similar to steps S401 to S410 in FIG. 4 in the first embodiment, but correction process (steps S1311 to S1314 in FIG. 13) following step S1310 differs from that in the first embodiment. The correction process performed by the correction section 26 will be described below.

The correction section 26 according to the second embodiment makes a correction in the subtraction range of the subtraction section 24. That is, the correction section 25 according to the first embodiment makes a correction in a range not limited to the subtraction range of the subtraction section 24 as shown in FIG. 9B, but the correction section 26 according to the second embodiment makes a correction only in the subtraction range of the subtraction section 24.

Specifically, the correction section 26 adds a correction value equal to the subtraction value at a maximum peak P8 to a crest (P8 to P10) containing the maximum peak P8 in a peak group P8 to P14 to which the subtraction process has been applied, as shown in FIG. 14. Accordingly, it is made possible to detect the original maximum peak P8 (the center of gravity of target) of the crest (P5 to P10) extending in the range of P8 to P14.

Figure 15:
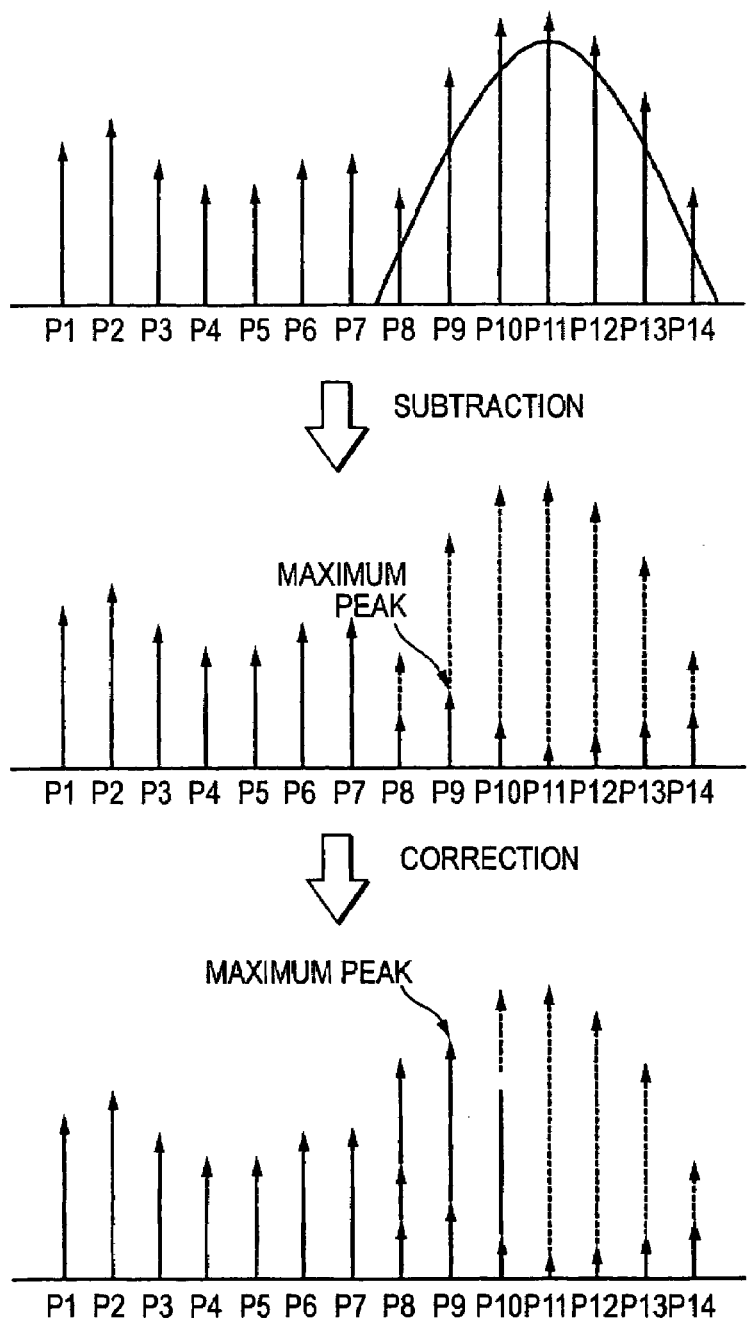
FIG. 15 is a drawing to describe correction performed by the target identifying section.

By the way, the correction section 26 executes the correction process only in the subtraction range of the subtraction section 24. However, if the correction process is always executed for various signal distributions, the following problem occurs. In a case of the signal distribution as shown in FIG. 15, if a correction is made to a crest (P8 to P10) containing the maximum peak P8, a value of the peak P8 of the original trough part becomes larger than the original value thereof and the crest (P8 to P10) is joined with the adjacent crest (P5 to P7). Consequently, the peak P9 is erroneously identified as the maximum peak of the adjacent peak.

Therefore, in a case where the original trough part will be lost by the correction and the crests will be joined with each other, the correction section 26 of the second embodiment does not make the correction. Specifically, the trough determining section 27 determines whether or not a trough originally existed in the correction target range within the subtraction range, namely, whether or not a local minimum value (minimum peak) existed in the correction target range within the signal distribution before subtraction performed by the subtraction section 24 (see step S1311 in FIG. 13).

Further, if a trough originally existed in the correction target range within the subtraction range (YES at step S1311), the trough determining section 27 determines whether or not the trough is lost by correction, namely, whether or not the local minimum value in the correction target range within the signal distribution before subtraction performed by the subtraction section 24 does not become a local minimum value in a signal distribution newly generated by correction (step S1312).

Figure 16:
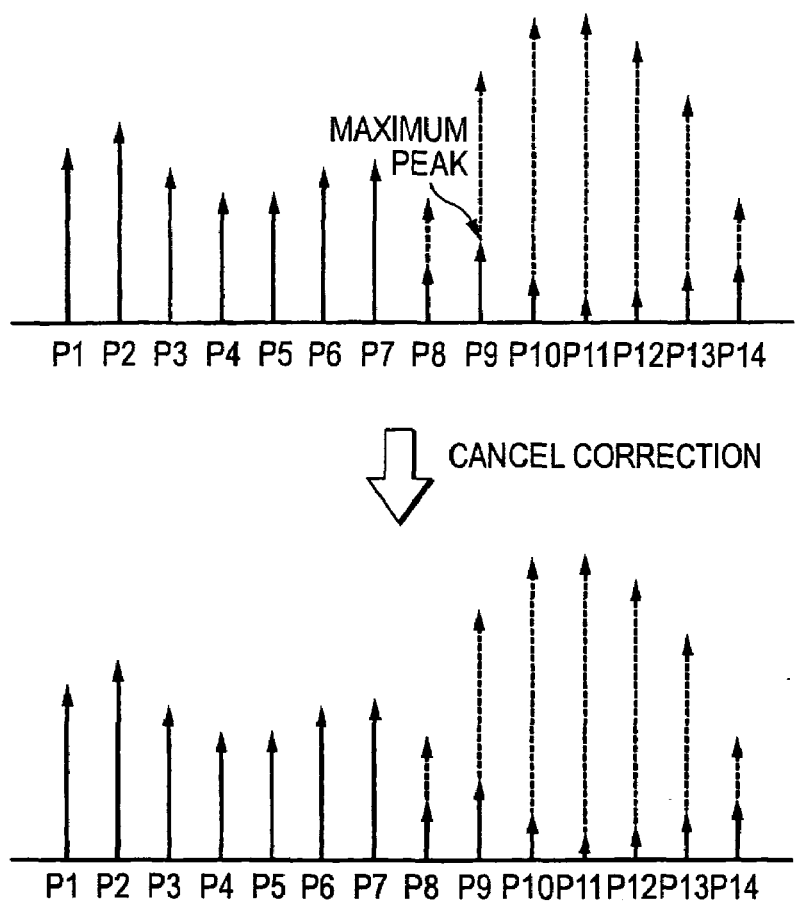
FIG. 16 is a drawing to describe correction performed by the target identifying section.

If a result of the determination indicates that the peak of the original trough becomes higher than the adjacent peak due to correction and the trough is lost (YES at step S1312), the correction section 26 cancels the correction as shown in FIG. 16 (step S1313). Consequently, the value of the peak P8 of the trough part does not become larger than its original value and, the crest containing the peak P9 is prevented from being erroneously joined with the adjacent crest (P5 to P7).

On the other hand, if no trough originally existed in the correction target range within the subtraction range (NO at step S1311) or if the trough is not lost even if correction is made (NO at step S1312), the correction section 26 makes the correction in the initial correction target range to generate a new signal distribution (step S1314) without considering the trough. Specifically, the correction amount equal to the subtraction amount of the maximum peak P8 is added to the crest (P8 to P10) containing the maximum peak P8 in the peak group P8 to P14 to which the subtraction process has been applied as shown in FIG. 14.

As described above, according to the second embodiment, when the target is identified with using the signal distribution corrected in the subtraction range after the subtraction process based on the quadratic approximate expression is performed for the signal distribution, if the original trough part is lost by correction and the crests are joined with each other, the correction is canceled. Therefore, it is made possible to avoid a target identifying error caused by the correction.

By the way, in the description of the second embodiment, the process other than the correction process of the correction section 26 (steps S1301 to S1310) is similar to that in the first embodiment, but the invention is not necessarily limited to the case where similar process is performed. The invention can be applied in a similar manner if at least process of identifying a target with using the signal distribution corrected in the subtraction range is performed after the subtraction process based on the quadratic approximate expression is performed for the signal distribution.

In the second embodiment, if the original trough part is lost by correction as shown in FIG. 16, the correction is canceled (see step S1313 in FIG. 13), but the invention is not limited thereto. The correction may be made so as to maintain the original trough.

Figure 17:
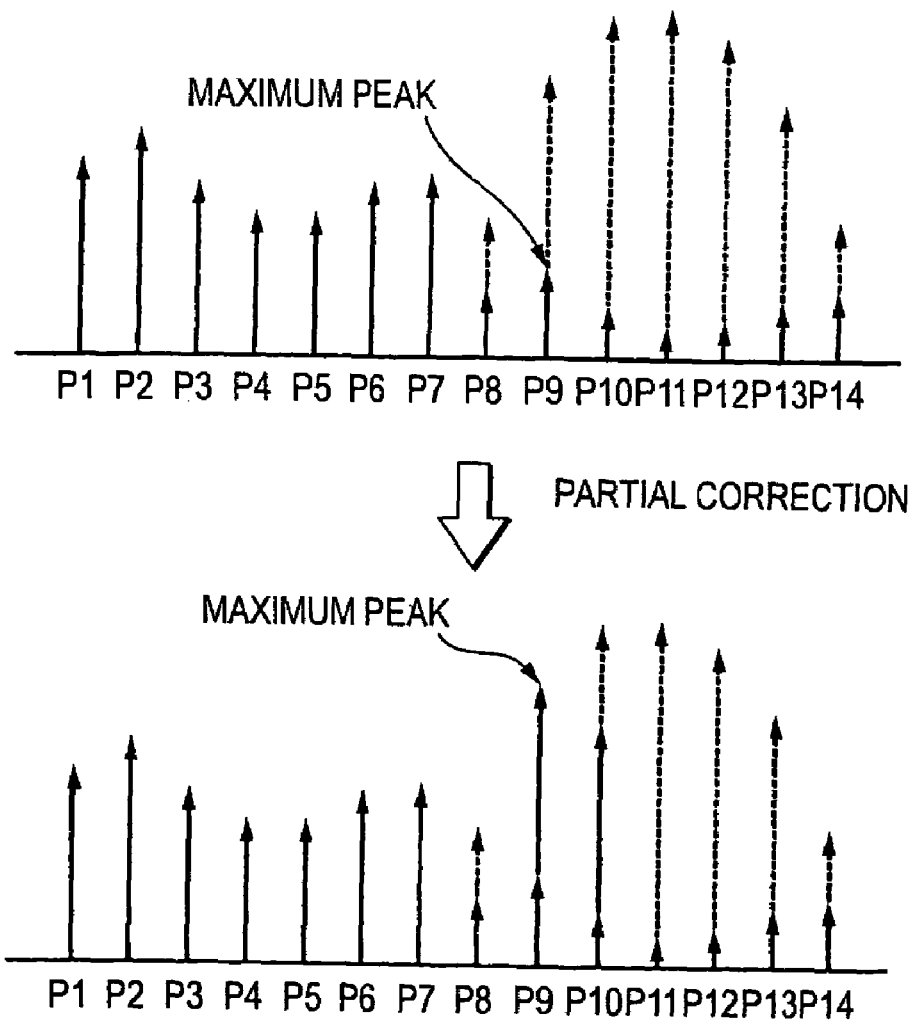
FIG. 17 is a drawing to describe correction performed by the target identifying section.

One example thereof will be given. If the original trough part is lost by correction, the correction may be made in the correction target range excluding the trough to generate a new signal distribution, as shown in FIG. 17. That is, the correction amount equal to the subtraction amount of the maximum peak is added to the peaks P9 and P10 excluding the trough in the correction target range (P8 to P10) containing the maximum peak P9, but not added to the peak P8 of the original trough part. Consequently, the value of the peak P8 of the trough part does not become larger than its original value, and the crest containing the peak 9 is prevented from being erroneously joined with the adjacent peak (P5 to P7).

Further, another example will be given. The case where correction after the subtraction process (adding the correction amount equal to the subtraction amount of the maximum peak P9) is not made to the peak P8 of the original trough part has been described with reference to FIG. 17, but the invention is not limited thereto. For example, a correction may be made in such a manner that the correction amount equal to the subtraction amount of the peak P8 is added to the peak P8 as shown in FIG. 18, so long as the original trough part is not lost by the correction.

Thus, if the original trough part is lost by correction, correction is made so as not to join the crest without canceling the correction. Thereby, the crest part is corrected with the original peak maintained. Therefore, it is made possible to reliably identify a target with avoiding a target identifying error caused by the correction.

Third Embodiment

The embodiments of the invention have been described as above. However, it is should be understood that the invention is not limited to the embodiments. Then, various embodiment will be discussed in (1) to (4) below as a third embodiment.

(1) Correction of Signal Distribution

For example, in the first and second embodiments, the case where a correction is made so as to add the value of the quadratic approximate expression subtracted from the maximum peak as shown in FIG. 9B has been described. However, the invention is not limited thereto. The correction may be made to add a value so that a value of the maximum peak after the correction becomes equal to or larger than at least the threshold value.

In the embodiment, the case where a correction is made in the peripheral range containing the maximum peak as shown in FIG. 9B has been described. However, the invention is not limited thereto. For example, only the maximum peak value may be corrected so long as at least a value of the maximum peak becomes larger than the threshold value.

(2) Calculation of Quadratic Approximate Expression

In the embodiment, the case where calculation process of calculating quadratic approximate expression, etc., is executed with using the signal distribution made up of the voltage values of the signals (reflection electric power sums) has been described. However, the invention is not limited thereto. A signal distribution made up of decibel values may be used.

In the embodiments, the case where first the quadratic approximate expression is calculated with using the signal values in the vicinity of the maximum peak as shown in FIG. 5B has been described. However, the invention is not limited thereto. The quadratic approximate expression may be calculated directly with using an antenna pattern.

(3) Identification of Target

In the embodiments, the case where targets are identified in the left and right direction and the back and forth direction has been described. However the invention is not limited thereto. The invention can be applied in a similar manner if a target is identified in a predetermined direction, for example, in such a manner that a target is further identified in an up and down direction, that a target is identified only in the left and right direction, or that a target is identified only in the back and forth direction.

In the embodiments, the case where targets are identified by the on-vehicle radar sensor has been described. However, the invention is not limited thereto. The invention can also be applied to a radar sensor installed in any other machine, system, and environment than the vehicle.

(4) System Configuration, Etc.

Of the processes in the embodiments described, all or some of the processes, which is assumed to be performed automatically, may also be performed manually by a known method. Also, all or some of the processes, which is assumed to be performed manually, may also be performed automatically by a known method. In addition, the process procedures, the control procedures, the specific names, various pieces of data, and information containing parameters (particularly, signal distributions) shown throughout the specification and the accompanying drawings may be changed as desired unless otherwise specified.

The components of the shown units (radar sensor 10, target identifying section 20, etc.,) are those like functional concept and do not necessarily require that they be physically configured as shown in the figures. That is, the specific modes of distribution and integration of the units is not limited to those shown in the figures and all or some of them can be distributed or integrated functionally or physically in any desired units in response to various load and use situations, etc. Further, all or some of the processing functions executed in the units can be implemented as a CPU and programs analyzed and executed by the CPU or can be implemented as hardware of wired logic.

The target identifying method described in the embodiment can be implemented as a provided program is executed in a computer such as a personal computer or a workstation (for example, a computer incorporated in a ECU installed in a vehicle). The program can be distributed through a network such as the Internet. The program can also be executed as it is recorded on a computer-readable medium such as a hard disk, a flexible disk (FD), a CD-ROM, an MO, or a DVD and is read from the record medium by a computer.

As described above, the target identifying apparatus, the target identifying method, and the target identifying program according to the embodiments of the invention are useful for identifying from a signal distribution with using the beam angle or the frequency provided by a scan radar as a parameter, a target contained in the signal distribution, and are particularly suited for reliably identifying each target even from a signal distribution in which a peak (signal) for each target does not clearly appear because a plurality of targets are close to each other in the left and right direction, in the back and forth direction or the like.

What is claimed is:

1. A target identifying apparatus for identifying a target from a first signal distribution obtained by a scan radar, the target identifying apparatus comprising:

a calculation section that calculates a quadratic approximate expression in the first signal distribution, the first signal distribution including one of beam angles and frequencies as a parameter, the quadratic approximate expression having the one of the beam angle and the frequency corresponding to a maximum value of the first signal distribution at a center thereof;

a target signal identifying section that identifies a signal contained in the quadratic approximate expression calculated by the calculation section as a single target signal, the target signal indicating the target;

a subtraction section that subtracts a value of the quadratic approximate expression calculated by the calculation section from a value of the first signal distribution to generate a second signal distribution; and a correction section, wherein when the one of the beam angle and the frequency corresponding to a maximum value of the second signal distribution generated by the subtraction section is in a range in which the value of the quadratic approximate expression is subtracted from the value of the first signal distribution or is in a vicinity of the range, the correction section corrects the second signal distribution based on the quadratic approximate expression;

when the correction section corrects the second signal distribution, the calculation section treats the corrected second signal distribution as a new first signal distribution; and when the correction section does not correct the second signal distribution, the calculation section treats the second signal distribution as a new first signal distribution.

2. The target identifying apparatus according to claim 1, wherein when the correction section corrects the second signal distribution, the correction section adds to values of the second signal value in the range, a value of the quadratic approximate expression at the one of the beam angle and the frequency corresponding to the maximum value of the second signal distribution.

3. The target identifying apparatus according to claim 1, wherein the calculation section calculates the quadratic approximate expression on a basis of the maximum value of the first signal distribution and values in a vicinity of the maximum value of the first signal distribution.

4. The target identifying apparatus according to claim 3, wherein when gradient of the quadratic approximate expression calculated on the basis of the maximum value of the first signal distribution and the values in the vicinity of the maximum value of the first signal distribution is gentler than that of an antenna pattern, the calculation section calculates another quadratic approximate expression on a basis of the antenna pattern and treats the other quadratic approximate expression as the quadratic approximate expression.

5. The target identifying apparatus according to claim 1, wherein the subtraction section subtracts the value of the quadratic approximate expression from the value of the first signal distribution only in a predetermined range containing the maximum value of the first signal distribution at a center thereof.

6. The target identifying apparatus according to claim 1, wherein the first signal distribution is made up of true values of reception signals, which are received by the radar sensor.

7. The target identifying apparatus according to claim 1, wherein if correcting performed by the correction section changes a value of the second signal distribution corresponding to a local minimum value of the first signal distribution into a value other than a local minimum value of the corrected second signal distribution, the correction section cancels correcting the second signal distribution.

8. The target identifying apparatus according to claim 1, wherein if correcting performed by the correction section changes a value of the second signal distribution corresponding to a local minimum value of the first signal distribution into a value other than a local minimum value of the corrected second signal distribution, the correction section corrects the value of the second signal distribution corresponding to the local minimum value of the first signal distribution to be the local minimum value of the first signal distribution.

9. The target identifying apparatus according to claim 1, wherein when the maximum value of the first signal distribution is smaller than a predetermined threshold value, the calculation section cancels calculating the quadratic approximate expression.

10. A method for identifying a target from a first signal distribution obtained by a scan radar, the method comprising:

calculating a quadratic approximate expression in the first signal distribution, the first signal distribution including one of beam angles and frequencies as a parameter, the quadratic approximate expression having the one of the beam angle and the frequency corresponding to a maximum value of the first signal distribution at a center thereof;

identifying a signal contained in the quadratic approximate expression as a single target signal, the target signal indicating the target;

subtracting a value of the quadratic approximate expression from a value of the first signal distribution to generate a second signal distribution;

when the one of the beam angle and the frequency corresponding to a maximum value of the second signal distribution is in a range in which the value of the quadratic approximate expression is subtracted from the value of the first signal distribution or is in a vicinity of the range, correcting the second signal distribution based on the quadratic approximate expression;

when the second signal distribution is corrected, treating the corrected second signal distribution as a new first signal distribution; and when the second signal distribution is not corrected, treating the second signal distribution as a new first signal distribution.

11. A program for identifying a target from a first signal distribution obtained by a scan radar, the program causing a computer to perform a method comprising:

calculating a quadratic approximate expression in the first signal distribution, the first signal distribution including one of beam angles and frequencies as a parameter, the quadratic approximate expression having the one of the beam angle and the frequency corresponding to a maximum value of the first signal distribution at a center thereof;

identifying a signal contained in the quadratic approximate expression as a single target signal, the target signal indicating the target;

subtracting a value of the quadratic approximate expression from a value of the first signal distribution to generate a second signal distribution;

when the one of the beam angle and the frequency corresponding to a maximum value of the second signal distribution is in a range in which the value of the quadratic approximate expression is subtracted from the value of the first signal distribution or is in a vicinity of the range, correcting the second signal distribution based on the quadratic approximate expression;

when the second signal distribution is corrected, treating the corrected second signal distribution as a new first signal distribution; and when the second signal distribution is not corrected, treating the second signal distribution as a new first signal distribution.

12. A target identifying apparatus for identifying a target from a first signal distribution obtained by a scan radar, the target identifying apparatus comprising:

a calculation section that calculates a quadratic approximate expression in the first signal distribution, the first signal distribution including one of beam angles and frequencies as a parameter, the quadratic approximate expression having the one of the beam angle and the frequency corresponding to a maximum value of the first signal distribution at a center thereof;

a target signal identifying section that identifies a signal contained in the quadratic approximate expression calculated by the calculation section as a single target signal, the target signal indicating the target;

a subtraction section that subtracts a value of the quadratic approximate expression calculated by the calculation section from a value of the first signal distribution to generate a second signal distribution; and a correction section corrects the second signal distribution in a predetermined range including a local maximum value of the second signal distribution to generate a corrected second signal distribution, wherein:

if correcting performed by the correction section changes a value of the second signal distribution corresponding to a local minimum value of the first signal distribution into a value other than a local minimum value of the corrected second signal distribution, the correction section cancels correcting the second signal distribution.

13. A target identifying apparatus for identifying a target from a first signal distribution obtained by a scan radar, the target identifying apparatus comprising:

a calculation section that calculates a quadratic approximate expression in the first signal distribution, the first signal distribution including one of beam angles and frequencies as a parameter, the quadratic approximate expression having the one of the beam angle and the frequency corresponding to a maximum value of the first signal distribution at a center thereof;

a target signal identifying section that identifies a signal contained in the quadratic approximate expression calculated by the calculation section as a single target signal, the target signal indicating the target;

a subtraction section that subtracts a value of the quadratic approximate expression calculated by the calculation section from a value of the first signal distribution to generate a second signal distribution; and a correction section corrects the second signal distribution in a predetermined range including a local maximum value of the second signal distribution to generate a corrected second signal distribution, wherein:

if correcting performed by the correction section changes a value of the second signal distribution corresponding to a local minimum value of the first signal distribution into a value other than a local minimum value of the corrected second signal distribution, the correction section corrects the value of the second signal distribution corresponding to the local minimum value of the first signal distribution to be the local minimum value of the first signal distribution.

* * * * *